UNITED STATES PATENT OFFICE.

KNUD ERSLEV, OF NIJMEGEN, NETHERLANDS, ASSIGNOR TO ANT. JURGENS VEREENIGDE FABRIEKEN, OF OSS, NETHERLANDS.

MANUFACTURE OF MARGARIN.

1,147,626.  Specification of Letters Patent.  Patented July 20, 1915.

No Drawing.  Application filed February 24, 1915.  Serial No. 10,359.

*To all whom it may concern:*

Be it known that I, KNUD ERSLEV, a subject of the King of Denmark, residing at 268 Groesbeekscheweg, Nijmegen, Holland, have invented new and useful Improvements in the Manufacture of Margarin, of which the following is a specification.

In manufacturing margarin in the usual way buttery aroma is imparted thereto by mixing and working into an emulsion therewith, milk, cream, or the like, in which an aromatic flavor has been developed by fermentation, a further quantity of such aromatized milk, cream, or the like, being, if necessary, added to the finished margarin. The aromatic or flavoring substances which are developed by such additions are volatile, and liable to readily alter, when the margarin is kept for some time, and care has had to be taken that, in the finished margarin, an after fermentation shall take place to form further aromatic substances, but, although in this way the objections are met to a certain extent, they are not completely overcome, and it has been one of the most important problems to satisfactorily retain the buttery aroma imparted to the margarin. By this present invention this problem is satisfactorily solved, by the addition of an organic salt, a lactate of an alkali being specially adapted for the purpose.

In carrying out this invention, lactate of alkali, or other organic salt having a similar effect, is added to the fat which has been emulsified with the fermented aromatized milk, cream, or the like, the mass after cooling being freed from excess of water by rolling, kneading, or other suitable means. The lactate of alkali, or other organic salt, can be added in the condition of a fine powder, or as a concentrated solution together with the ingredients (such as egg yolk, cream, or the like,) which may be added to the emulsion in the mixer.

The lactate of alkali, or other organic salt, may be added to the fat in different quantities according to the effect required. As a rule one per cent. will be sufficient, but more or less than this quantity may be used, for instance it may be as much as two per cent., without causing any objectionable flavor in the margarin, and as a rule the amount should be over one half of one per cent. If desired common salt can be added as usual, in addition to the lactate of alkali, or other organic salt.

What I claim is—

1. In the manufacture of margarin the addition of lactate of alkali for the purpose of preserving the buttery aroma.

2. In the manufacture of margarin the addition of lactate of alkali in amount not less than one half of one per cent. for the purpose of preserving the buttery aroma.

In testimony whereof I have signed my name to this specification in the presence of two subscribing witnesses.

KNUD ERSLEV.

Witnesses:
 MARIUS DE LEEUW,
 GEO. DUYSE.